Feb. 23, 1937.    W. J. FIEGEL    2,071,619
STRIP MILLING MACHINE.
Filed May 8, 1933    5 Sheets-Sheet 1

Inventor
William J. Fiegel

Inventor
William J. Fiegel

Inventor
William J. Fiegel

Patented Feb. 23, 1937

2,071,619

UNITED STATES PATENT OFFICE 2,071,619

STRIP MILLING MACHINE

William J. Fiegel, Detroit, Mich., assignor to Bohn Aluminum and Brass Corporation, Detroit, Mich., a corporation of Michigan Application May 8, 1933, Serial No. 670,013

11 Claims. (Cl. 90—21)

This invention relates to a milling apparatus and more especially to an apparatus of this character particularly adapted for use in the formation of bearings by a continuous method from a continuous strip of material.

One of the important objects of this invention is to provide a milling apparatus adapted to operate upon the surface of a continuously advancing strip to machine at least one surface thereof. When the strip is a composite strip provided with a layer of Babbitt metal on one surface thereof, the present machine is particularly adapted for machining the babbitted surface to thus reduce the composite strip to approximate thickness.

Another object of this invention is to provide means for continuously feeding the work piece or strip to and past the milling cutter and for controlling the movement and speed of travel of the work piece or strip.

Another object of this invention is to provide means whereby the feed of the work piece or strip may be accurately regulated and otherwise controlled.

Another object of the invention is to provide a device of this character having means for accurately presenting the surface to be machined to the milling cutter.

The invention also has as its objects to simplify, render more efficient, and improve generally devices of this character, and to this end consists in the novel combination, construction and arrangement of parts, all of which may be made more apparent as this description proceeds, especially when considered in connection with the accompanying drawings, wherein Figure 1 is a sectional elevational view through a milling machine constructed in accordance with this invention;

Figure 1:
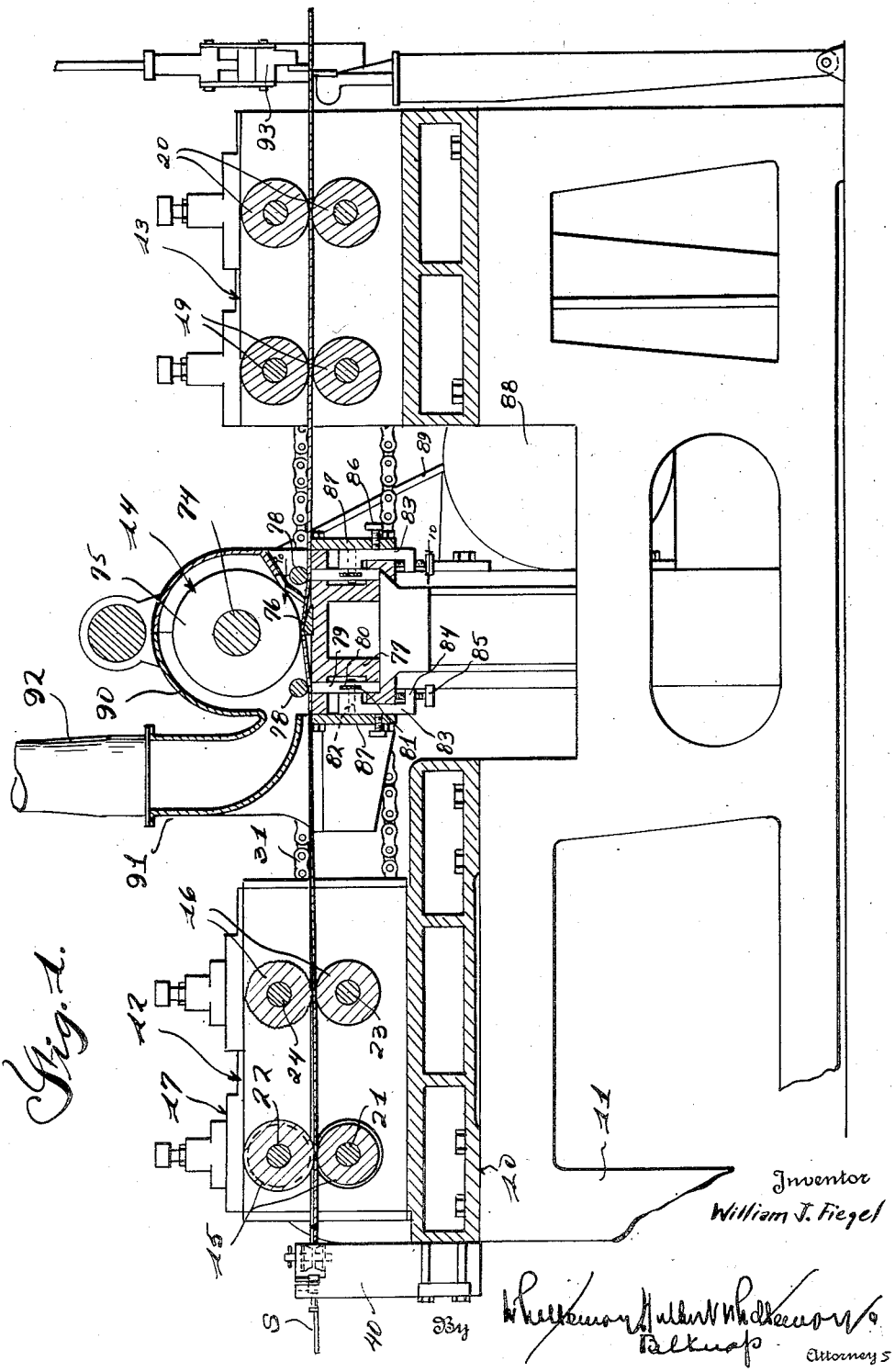
Figure 2:
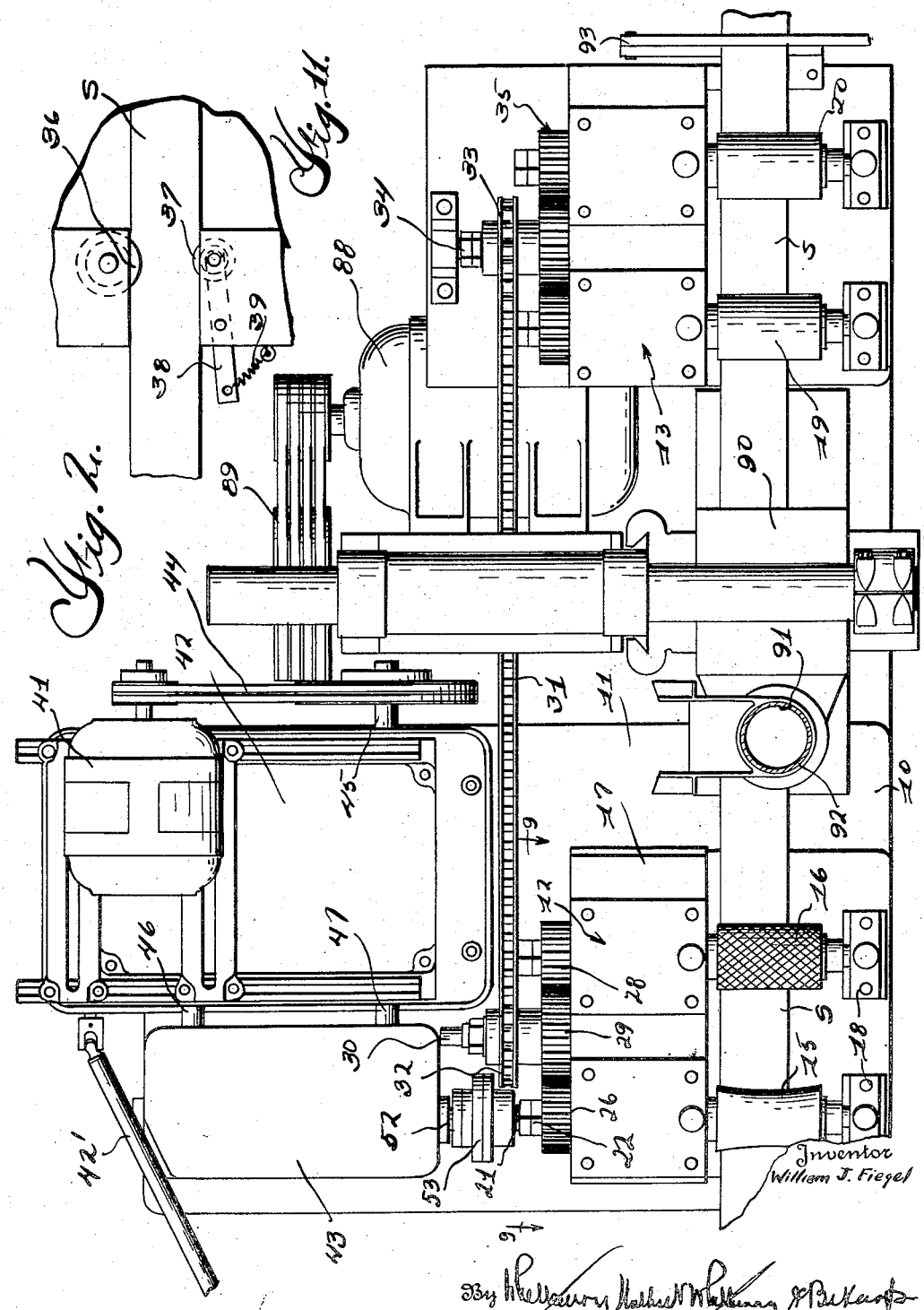
Figure 2 is a top plan view of the structure illustrated in Figure 1.
Figure 3:
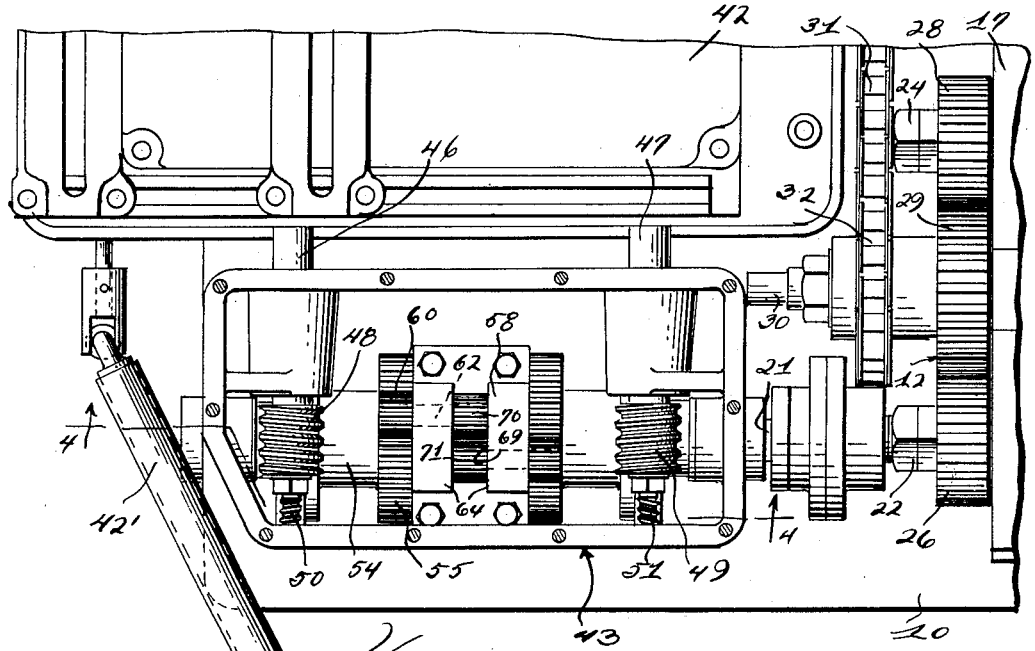
Figure 3 is an enlarged fragmentary plan view of a portion of the machine, certain parts being removed to show the inner construction.
Figure 4:
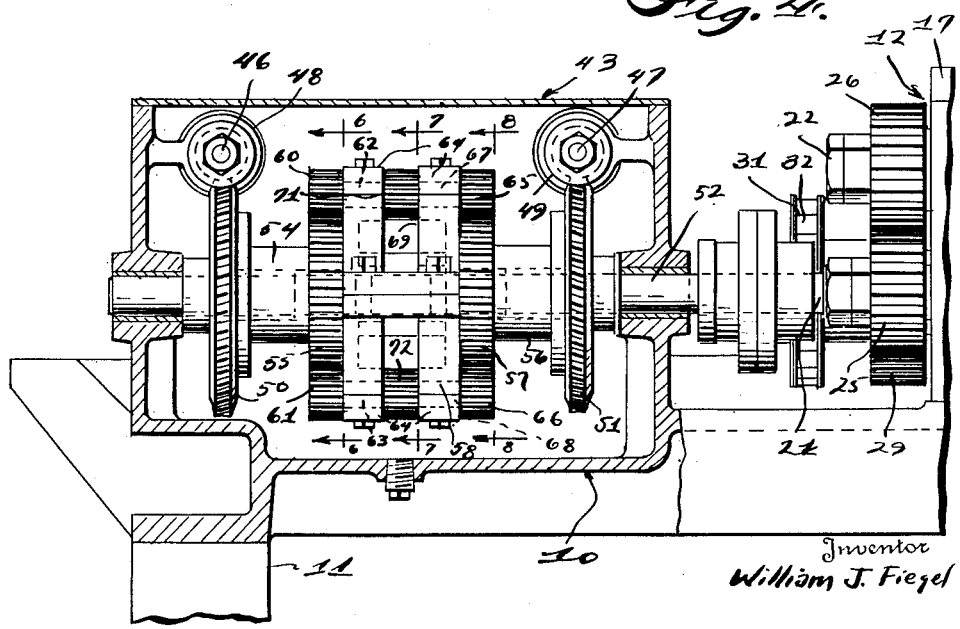
Figure 4 is a sectional elevational view taken substantially on the plane indicated by the line 4—4 of Figure 3 looking in the direction of the arrows.
Figure 5:
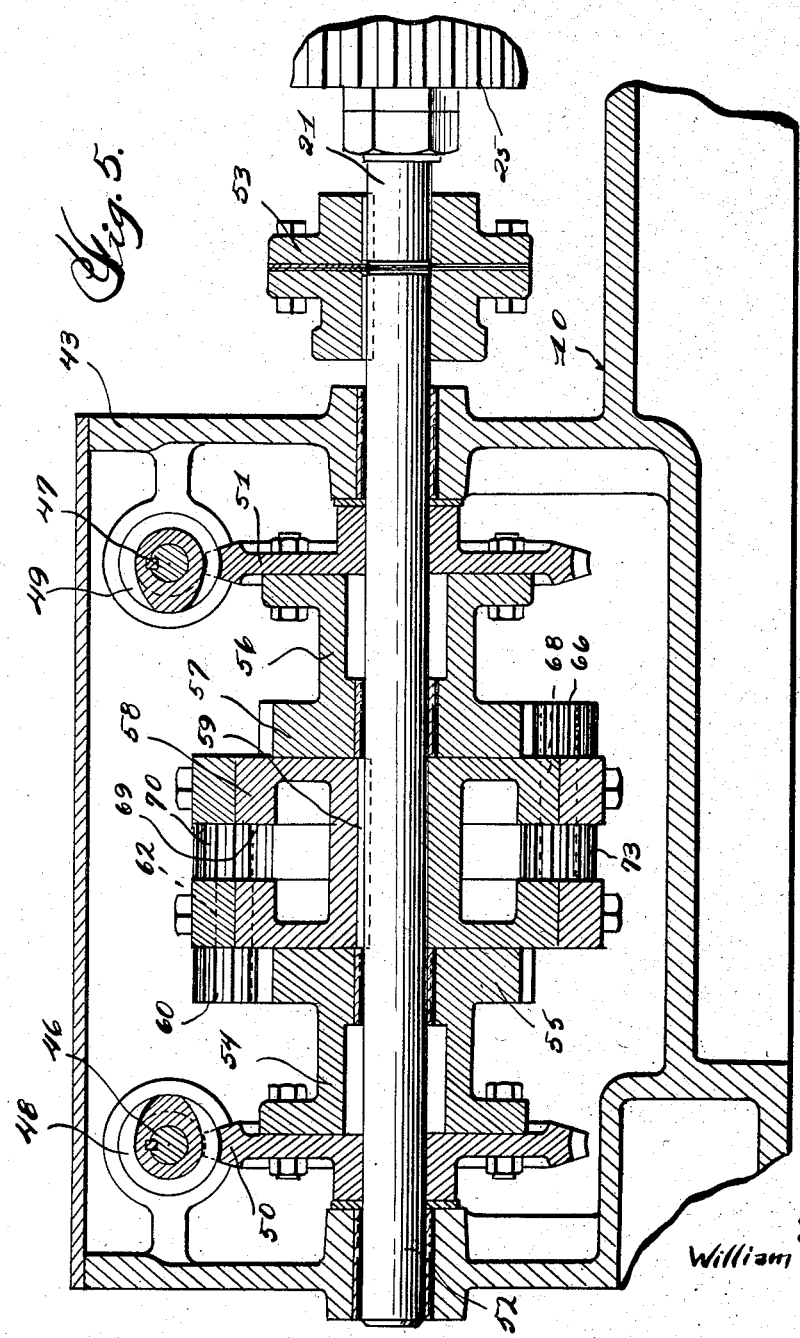
Figure 5 is an enlarged longitudinal vertical sectional view through the structure illustrated in Figure 4.
Figure 6:
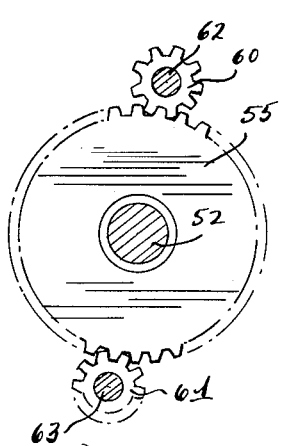
Figure 7:
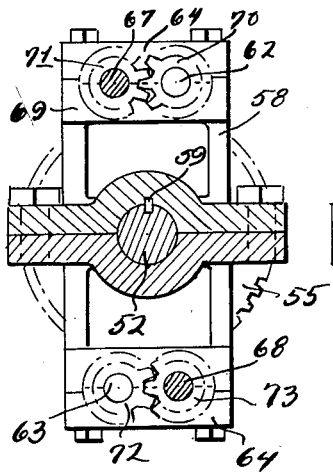
Figure 8:
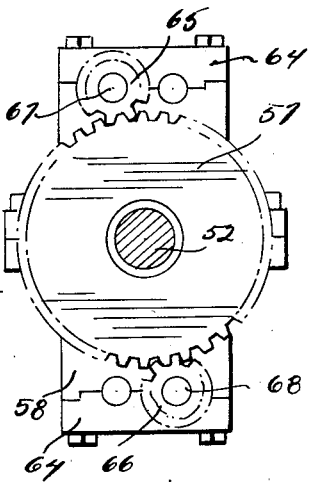
Figure 9:
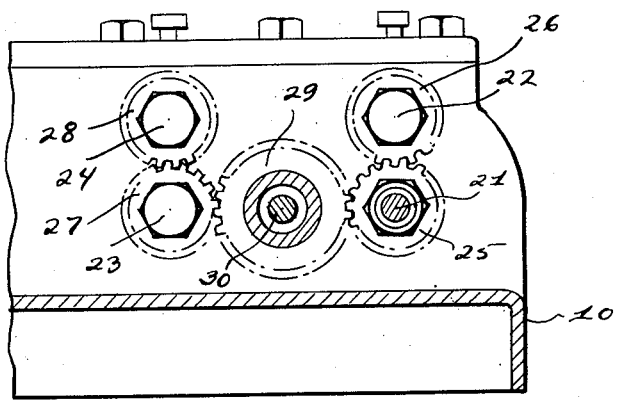
Figure 10:
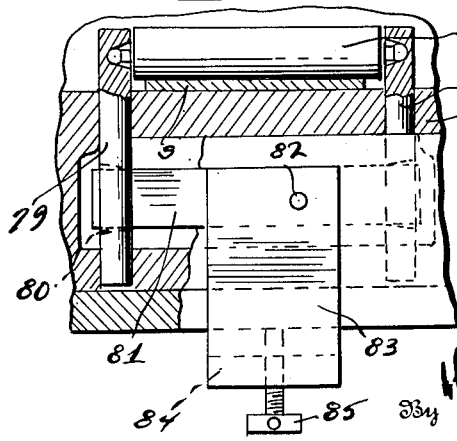

Figures 6, 7 and 8 are sections taken respectively on the lines 6—6, 7—7 and 8—8 of Figure 4, looking in the direction of the arrows;

Figure 9 is a fragmentary vertical sectional view taken substantially on the plane indicated by line 9—9 in Figure 2;

Figure 10 is an enlarged detail sectional elevational view taken substantially on the plane indicated by line 10—10 of Figure 1, and Figure 11 is a top plan view of the strip guiding mechanism.

Referring now more particularly to the drawings wherein like reference characters indicate like parts, it will be noted that the apparatus comprises a suitable bed or base 10 mounted upon a supporting structure 11. The work piece or strip to be operated upon is indicated by the reference character S and is adapted to be fed longitudinally through the machine in a manner to be more fully hereinafter referred to.

While the present invention may be used to advantage in other ways, it finds particular utility when used in connection with a method of and apparatus for forming steel-back bearings and half bearings from a continuous strip of metal. In practising such a method, a continuous strip of metal, such for instance as previously tinned steel, is caused to continuously and successively pass through, for instance, a babbitting machine or unit wherein the tinned strip has deposited thereon a layer of babbitt metal; a cooling unit wherein the composite strip is cooled to harden the Babbitt metal; and a milling unit such as the present device wherein the babbitted surface of the strip is machined and the composite strip reduced to approximate thickness.

To accomplish the objects of the present invention, the present apparatus comprises two sets of feed rolls indicated generally by the reference characters 12 and 13 respectively and a machining device or milling cutter indicated generally by the reference character 14 located between the sets of feed rolls 12 and 13.

The principal purpose of the sets of rolls 12 and 13 is to positively feed the work piece or strip S past the milling cutter 14 at the preferred or desired speed, and to maintain the strip taut so that it may be accurately presented to the machining tool.

Thus the set of driving rolls 12 consists of two pairs of driving rolls 15 and 16 positively driven through suitable gearing yet to be referred to. These sets of rolls are rotatably journalled in suitable supports 17 and 18 mounted upon the bed or base 10 of the machine.

The upper of the pair of rolls 15 is preferably convex in longitudinal contour, whereas the lower roll of this pair has a corresponding concave contour. This dishes or bows the strip S transversely and acts to eliminate any tendency of the strip to dish or bow upwardly. The other pair of rolls 16 are cylindrical although the upper of this pair of rolls is preferably knurled.

The other set of rolls 13 comprises two pairs of rolls 19 and 20. These rolls are also positively driven by suitable gearing in a manner yet to be referred to. The sets of rolls 19 and 20 are of larger diameter than the sets of rolls 15 and 16, thus tending to feed the strip slightly faster than the rolls 15 and 16 to thus hold the strip taut while passing the milling cutter.

By reference to Figure 9, the drive for the sets of rolls 15 and 16 will be described. In this figure, the reference characters 21 and 22 indicate respectively the shafts of the lower and upper rolls respectively of the set of rolls 15 and the reference characters 23 and 24 indicate respectively the shafts of the lower and upper rolls of the set of rolls 16. The shafts 21 and 22 have respectively keyed thereto pinions 25 and 26 which pinions intermesh as clearly illustrated. In a like manner, the shafts 23 and 24 have respectively keyed thereto intermeshing pinions 27 and 28. The reference character 29 indicates a gear mounted on a stub shaft 30 which gear intermeshes with the pinions 25 and 27 respectively. The shaft 21 is connected to a power shaft in a manner yet to be referred to, and thus through the intermeshing pinions and gears the sets of rolls 15 and 16 are positively driven in timed relation to one another.

The train of intermeshing pinions and gears just referred to in connection with the sets of rolls 15 and 16 is substantially duplicated for driving the sets of rolls 19 and 20. In order to supply power to this second train of gears, and in order that the sets of rolls 19 and 20 may be rotated in timed relation with the rolls 15 and 16, the two trains of gears are connected by a chain drive which consists of a chain 31 which engages a sprocket wheel 32 keyed to the stub shaft 30, this chain also engaging a sprocket wheel 33 keyed to the shaft 34 of the second train of gears 35 which shaft 34 corresponds to the shaft 30 of the first train of gears. In all other respects the second train of gears is similar to the first train of gears with the exception that the shaft corresponding to the shaft 21 is not connected to a power shaft.

In order that the strip S may be longitudinally guided to the first of the sets of driving and feeding rolls, guiding means are provided (see particularly Figure 11) comprising a grooved roller 36 adapted to engage one longitudinal edge of the strip and a companion grooved roller 37 mounted on a pivotally supported arm 38, which arm is urged by means of a spring 39 in a direction to maintain the roller 37 in engagement with the edge of the strip S. These rollers are mounted on a bracket 40 arranged in advance of the first set of feed rolls 15 (see more especially Figure 1).

In order that the speed of the driving rolls 15, 16, 19 and 20 may be accurately regulated and controlled, a variable speed drive is provided which consists of a source of power here shown as a motor 41, a Reeves transmission 42, and a differential gear unit 43.

The motor 41 is connected by means of a belt or chain 44 to the shaft 45 of the Reeves transmission 42. The reference characters 46 and 47 indicate respectively the two driven shafts of the Reeves transmission.

These shafts 46 and 47 extend into the housing of the differential gear unit 43 and carry respectively worms 48 and 49. These worms mesh respectively with worm wheels 50 and 51. These worm wheels are loosely journalled on a shaft 52 which in turn is rotatably journalled in the housing of the gear unit 43, this shaft extending beyond the housing at one end thereof and being connected by means of a coupling 53 with the shaft 21 of the train of gears employed for driving the feed rolls 15 and 16 previously referred to.

Fixed to the worm wheel 50 is a sleeve member 54 provided with a sun gear 55, and fixed to the worm wheel 51 is a sleeve member 56 provided with a sun gear 57. The reference character 58 indicates a spider keyed to the shaft 52 as at 59. This spider constitutes a pinion or gear carrier upon which a plurality of planet pinions or gears are mounted.

By reference to Figures 5 to 8, inclusive, this construction will be more readily understood. Meshing with the sun gear 55 are planet pinions 60 and 61 keyed on shafts 62 and 63 respectively, which shafts are journalled on spider 58. To accomplish this, the spider is preferably formed with journal recesses and caps 64 for closing the journal recesses are provided.

Meshing with the sun gear 57 are planet pinions 65 and 66, these pinions being keyed respectively to shafts 67 and 68 also similarly journalled in the carrier spider 58.

The spider or carrier 58 is provided with a central recess 69 into which the shafts 62, 67, 63 and 68 project, and arranged within this recess of the carrier spider and keyed to these shafts are pinions 70, 71, 72 and 73 respectively. As will be observed from Figure 7, the pinions 70 and 71 mesh with one another, and the pinions 72 and 73 mesh with one another.

As is customary with the standard and well-known types of Reeves transmissions, the shafts 46 and 47 may be rotated at the same speed or at differential speeds. As has been described, each of these shafts 46 and 47 is provided with a worm 48 and 49 respectively. These worms are pitched in opposite directions, or in other words, have opposed helical angles so that the worm wheels 50 and 51 are rotated in opposite directions. As has been heretofore pointed out, by properly adjusting the Reeves transmission, as for instance by means of an adjusting shaft 42', the shafts 46 and 47 may be rotated at the same speed or either of the shafts may be rotated faster than the other. Thus through the worm gearing 48—50 and 49—51 the sun gears 55 and 57 may be driven in a like manner. If the sun gears 55 and 57 are driven at the same speed, then by reason of the differential gear action the carrier or spider 58 will not be rotated and hence the shaft 52 will not be driven. When, however, one of the sun gears is rotated faster than the other there will be a corresponding driving movement imparted to the carrier 58, and hence to the shaft 52, and the direction of rotation of the shaft 52 may even be changed by rotating the proper one of the sun gears at a speed greater than the other sun gear. This gearing arrangement, moreover, provides a very accurate variable speed gearing for driving the shaft 52, and consequently the trains of gears employed for rotating the feed rolls 15—16 and 19—20.

The reference character 74 indicates the shaft of the milling cutter 75. At the point where the cutter 75 engages the surface of the strip S, the strip is raised out of the general plane of its path of travel by being caused to pass over an anvil or the like 76 fixed on a bed or support 77. Arranged on either side of the anvil 76 is a roller 78. These rollers are arranged to engage the strip S to assist in accurately positioning the same for the machining operation performed by the milling cutter 75. Each roller 78 (see particularly Figure 10) is rotatably mounted in a pair of supports 79 capable of independent vertical movement in the bed or support 77. Each of the supports 79 is provided with an opening 80 therethrough engaged by a cross member 81. The opening 80 of each of the supports 79 is flared from the center outwardly in both directions so that a slight rocking movement is permitted between the cross member 81 and each of the supports 79. The cross member 81 is pivoted as at 82 to a bracket 83 and the lower edge of the bracket is provided with an angularly extending edge or flange 84 (see particularly Figure 1) extending under the adjacent bottom edge of the bed or support 77. This provides a mounting for a set screw 85 which extends through a threaded aperture in this flange 84 to engage the bottom face of the bed 77. Thus the pressure with which the corresponding roller 78 engages the work piece may be regulated. Each bracket 83 is further secured in position by a set screw 86 which extends through an adjacent cap plate 87 to engage the outer face of the bracket.

The shaft 74 of the milling cutter 75 is driven by means of a motor or other source of power 88 through suitable gearing 89.

The milling cutter is enclosed in a housing 90 having an outlet 91 which is connected to a conduit 92 by means of which the chips from the milling cutter may be conveyed away and reclaimed.

If desired, a shearing device or cutter, indicated generally by the reference character 93, may be provided beyond the last set of feed rolls so that the strip may be severed when a desired length thereof has passed through the machine.

In the foregoing description the operation of the apparatus will no doubt be immediately apparent. It will be seen, therefore, that a strip or work piece is continuously fed to and past the milling cutter, which when the strip is a composite babbitted strip, will machine the babbitted surface and reduce the composite strip to approximate thickness. The feed rolls are designed to positively and uniformly feed the strip and to maintain the same taut as it passes the milling cutter. Moreover, means are provided for accurately presenting the strip to the cutter and so holding the strip during the milling operation.

By means of the variable speed gearing provided, the speed of travel of the strip may be accurately controlled so that the speed of travel of the strip may be properly regulated with respect to the action of the milling cutter upon the surface being machined.

While the herein described embodiment of this invention has been found in practice to give entirely satisfactory results, it will be readily apparent to those skilled in this art that various changes in many of the non-essential details of this invention may be resorted to without departing from the spirit and scope thereof, and to this end reservation is made to make such changes as may come within the purview of the accompanying claims.

What I claim as my invention is:

1. In an apparatus of the class described for use in connection with a strip-like work piece, a machining device, feed rolls arranged on opposite sides of said machining device for presenting the work piece thereto, means for driving the feed rolls at different peripheral speeds and means for controlling the relative speeds of said feed rolls to regulate the rate of travel of said work piece.

2. In an apparatus of the class described for use in connection with a strip-like work piece, a milling cutter, sets of feed rolls arranged on opposite sides of said milling cutter for presenting the work piece thereto, means interconnecting said sets of feed rolls for operating the same in timed relation with one another, these sets of rolls on opposite sides of said milling cutter having different peripheral speeds, and means for varying the speed of rotation of said feed rolls thereby to vary the speed of travel of said work piece.

3. In an apparatus of the class described for use in connection with a continuously advancing strip of metal, a milling cutter, sets of feed rolls arranged on opposite sides of said milling cutter for continuously advancing said strip of metal past said milling cutter, means interconnecting said sets of feed rolls for rotating the same in timed relation to one another, the feed rolls on one side of said milling cutter having a greater peripheral speed than the feed rolls on the other side thereof, and means including differential gearing for driving said feed rolls, as and for the purpose set forth.

4. In an apparatus of the class described for use in preparing a continuous strip for the formation of bearings and the like, a milling cutter for machining a surface of a continuous work piece strip, feed rolls located on opposite sides of said milling cutter for feeding the strip, said rolls having different peripheral speeds acting to hold said strip taut, and means for controlling the speed of rotation of said feed rolls, as and for the purpose set forth.

5. In an apparatus of the character described, sets of feed rolls for continuously advancing a strip-like work piece, a milling cutter adapted to operate on one surface of said work piece, an anvil adjacent said milling cutter for presenting said strip for engagement by said milling cutter, and means for holding said strip accurately in engagement with said anvil, for the purpose set forth.

6. In an apparatus of the character described, a milling cutter rotated at a constant speed, sets of feed rolls arranged on opposite sides of said milling cutter for continuously advancing a strip-like work piece to and past said milling cutter, and driving means for the rolls including variable speed mechanism for varying the speed of rotation of said feed rolls to control the speed of travel of said strip, as and for the purpose set forth.

7. In an apparatus of the class described, a milling cutter, sets of feed rolls arranged on opposite sides of said milling cutter for continuously advancing a continuous strip-like work piece to and past said milling cutter, a guide roll on opposite sides of said milling cutter and adjacent thereto, and means for mounting each guide roll permitting limited longitudinal tilting movement thereof.

8. In an apparatus of the character described, a milling cutter, sets of feed rolls arranged on opposite sides of said milling cutter adapted to feed a strip to and past said milling cutter, one of said sets of rolls including a pair of rolls having longitudinal contours adapted to transversely bow said strip, said set of rolls also including a roll having a knurled periphery, the other set of rolls being of larger diameter than the first said set of rolls thus providing for a greater peripheral speed thereof, for the purpose set forth.

9. In an apparatus of the class described for use in connection with a strip-like work piece, a machining device, feed rolls arranged on opposite sides of said machining device for presenting the work piece thereto, means including differential gearing for rotating said feed rolls to control the speed of travel of said work piece and to permit the rolls on one side of the machining device to be rotated at a greater peripheral speed than the rolls on the opposite side of the machining device, and means for actuating the machining device independent of the differential gearing.

10. In an apparatus of the class described for use in connection with a strip-like work piece, a machining device, feed rolls arranged on opposite sides of said machining device for presenting the work thereto, means for controlling said feed rolls to regulate the speed of travel of said work piece, and means for actuating the machining device independent of said controlling means.

11. In an apparatus of the class described for use in connection with a strip-like work piece, a machining device, feed rolls arranged on opposite sides of the machining device for presenting the work piece thereto, and means for rotating the rolls on one side of the machining device at a greater speed than the rolls on the opposite side of said device in order to maintain the work piece under tension.

WILLIAM J. FIEGEL.